Aug. 18, 1959     C. E. THOMPSON     2,900,202
PROPELLER HUB ASSEMBLY
Filed July 12, 1957
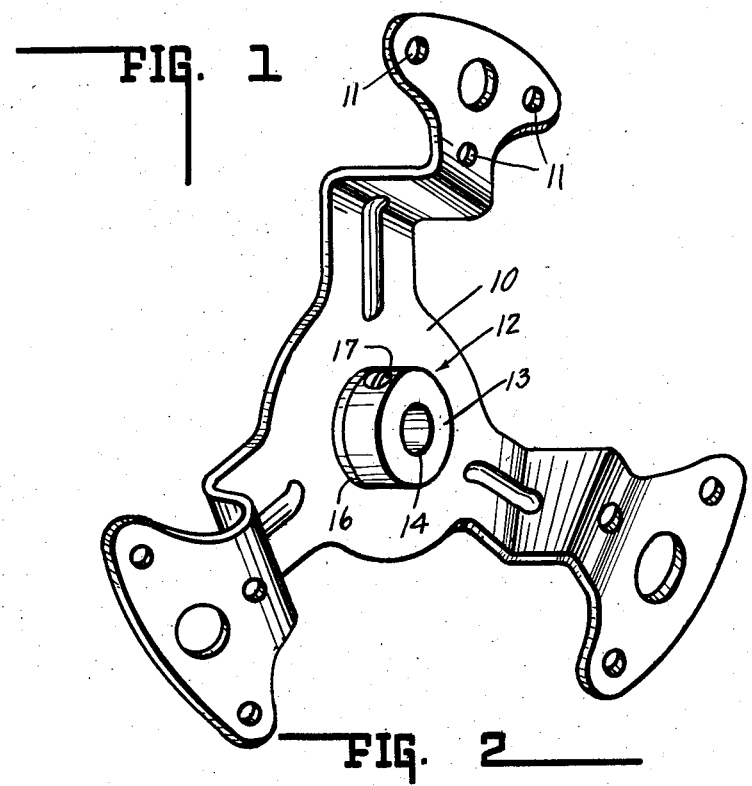
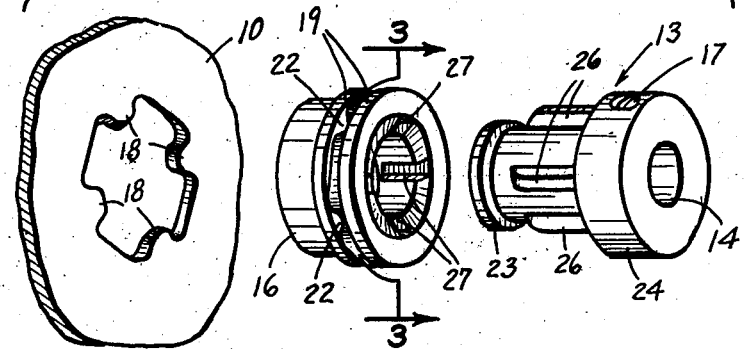
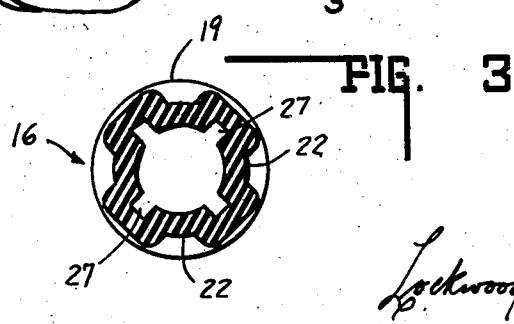
INVENTOR.
CHARLES E. THOMPSON.
BY
Lockwood, Galt, Woodard & Smith.
ATTORNEYS.

2,900,202

PROPELLER HUB ASSEMBLY

Charles E. Thompson, Indianapolis, Ind., assignor to Meier Electric and Machine Company, Inc., Indianapolis, Ind., a corporation Application July 12, 1957, Serial No. 671,582

1 Claim. (Cl. 287—52.04)

This invention relates generally to propeller hub assemblies, and particularly to such assemblies in which a rubber grommet is interposed between the propeller spider and the drive shaft receiving hub.

In mounting propellers or fan blades for moving air for cooling or other purposes, it has become conventional to couple the propeller to the drive shaft by means of a hub assembly which utilizes a grommet or insert of relatively soft, resilient material, such as rubber or the like, between the drive shaft and the propeller hub. This type of mounting effectively isolates motor vibration and noises, particularly A.C. hum, from the propeller blades and generally produces more satisfactory fan operation.

However, there are problems encountered with this conventional type of fan hub assembly. These stem from the fact that the rubber grommet is conventionally bonded to the shaft receiving bore of the hub and the hub assembly then pressed fitted upon the shaft. In the installation of the hub on the shaft, the rubber grommet is invariably tightly compressed, thus reducing its vibration insulating characteristics and weakening the resistance of the grommet to the shear stresses developed therein during operation of the propeller.

Further, due to the wide difference in thermal expansion characteristics between the metallic drive shaft and the rubber grommet, upon prolonged and pronounced ambient temperature decrease, the drive shaft tends to loosen from driving engagement with the rubber grommet, the fan or propeller thus losing its power. If the propeller is being used to cool delicate process equipment, or similar machinery, it will be evident that any unmonitored failure of driving power to the propeller can result in serious damage.

The principal object of the present invention is to provide a propeller hub assembly in which a rubber grommet is interposed between a vaned hub and the propeller blade mounting spider, the grommet having slots accommodating the hub vanes and having circumferential depressions rotatably locking it to the propeller spider by receiving spaced teeth formed on the spider.

A further object of the present invention is to provide a hub assembly in which the tip-to-tip distance between diametrically opposed teeth formed in the central opening through the spider is less than the tip-to-tip distance between diametrically opposed vanes carried by the hub so that the propeller will not be completely freed from driving connection with the shaft should the grommet interposed between the spider and the hub be ruptured.

A further object of the present invention is to provide a hub assembly, utilizing a rubber grommet, in which driving power to the propeller cannot be interrupted by differences in thermal expansion of the rubber grommet and associated metal parts.

The full nature of the invention will be understood from the accompanying drawings and the following description and claim:

Fig. 1 is a perspective view of a propeller spider incorporating a hub assembly embodying the present invention.

Fig. 2 is an exploded view of the hub assembly.

Fig. 3 is a sectional, end view of the rubber grommet taken generally along the line 3—3 of Fig. 2.

Referring initially to Figs. 1 and 2, there is shown at 10 a propeller spider having a plurality of offset flanges provided with mounting holes 11 for conventionally securing propeller blades to the spider. Centrally upon the spider is mounted a hub assembly 12 including a hub 13, having a drive shaft receiving opening 14 therethrough, and a rubber grommet 16. The hub carries a means, such as set screw 17, for rigidly securing the hub to a drive shaft (not shown).

As shown in Fig. 2, the spider has an opening therein formed to provide spaced, inwardly directed teeth 18 positioned diametrically opposite each other. The grommet 16, preferably formed of a synthetic rubber material such as neoprene, is adapted to be accommodated within the spider opening with circumferential ridges 19 overlying opposite faces of the spider. Between the ridges, the grommet has circumferentially spaced depressions 22 for receiving the inwardly extending teeth formed on the spider.

The drive shaft receiving hub 13 extends through a central bore in the grommet and is provided at each of its ends with annular flanges 23 and 24 which serve to retain the grommet on the hub. The intermediate portion of the hub carries circumferentially spaced, diametrically opposed vanes 26 which are accommodated within matching slots 27 in the grommet.

In operation, with the hub assembly mounted upon a drive shaft by means of the set screw 17, a rotary motion imparted to the hub will be transferred to the grommet by means of the vanes 26 and the accommodating slots 27, and, by means of the extension of the spider teeth into the grommet depressions 22, this rotary motion will be imparted to the propeller spider.

It will be noted that the vane accommodating slots formed in the grommet are positioned so as to fall between the circumferential depressions formed in the outer surface of the grommet. It should be further noted that the vanes are sized so that the tip-to-tip distance between diametrically opposed vanes is greater than the tip-to-tip distance between the diametrically opposed teeth carried by the propeller mounting spider. This arrangement of parts insures that should the grommet rupture as a result of deterioration, the hub will not be free to rotate within the spider, but, because of engagement of the vanes with the spider teeth, will continue to drive the propeller.

As previously pointed out, this feature prevents loss of cooling air to equipment or machinery should the grommet fail during a period when the machinery is unattended. It should be further noted that the openings in the propeller spider, the grommet, and the hub are all relatively sized so that when they are assembled the grommet is substantially free of compressive stress.

This freedom from compressive stress increases the strength and service life of the grommet. Since the coupling is not bonded to either the hub or the spider, it provides a true floating coupling therebetween with improved noise and vibration insulating characteristics.

While the invention has been illustrated and described in detail in the drawings and fore-going description, the same is to be considered as illustrative and not restrictive in character, it being understood that only the preferred embodiment has been shown and described and that all changes and modifications that come within the spirit of the invention and the scope of the claim are also desired to be protected.

The invention claimed is:

A coupling assembly for mounting a propeller element on a rotating shaft comprising a propeller blade mounting spider, a central opening in the spider defining spaced inwardly directed teeth positioned diametrically opposite each other, a non-metallic grommet accommodated within said opening having a central bore and having spaced circumferential ridges overlying opposite faces of said spider, circumferentially spaced depressions formed in said grommet for receiving said teeth, a shaft receiving hub having spaced, diametrically opposed vanes thereon, said hub extending through the grommet bore, spaced slots formed in said grommet to accommodate said vanes, said slots being positioned so as to fall between the circumferential depressions formed in the grommet, the tip-to-tip distance between diametrically opposed vanes being greater than the tip-to-tip distance between diametrically opposed teeth to prevent complete freeing of the spider from the hub upon rupture of the grommet.

References Cited in the file of this patent

UNITED STATES PATENTS

| | | |
|---|---|---|
| 1,780,727 | Tenney | Nov. 4, 1930 |
| 1,868,163 | Evans | July 19, 1932 |
| 2,199,926 | Swennes | May 7, 1940 |
| 2,558,589 | Skolfield | June 26, 1951 |
| 2,725,692 | Andreae | Dec. 6, 1955 |